(12) United States Patent
Carter et al.

(10) Patent No.: US 7,526,706 B2
(45) Date of Patent: Apr. 28, 2009

(54) METHOD AND APPARATUS FOR PREVENTING NETWORK OUTAGES

(75) Inventors: William Stephen Carter, Round Rock, TX (US); Herman Dietrich Dierks, Jr., Round Rock, TX (US); Mallesh Lepakshaiah, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 11/334,677

(22) Filed: Jan. 18, 2006

(65) Prior Publication Data

US 2007/0168823 A1 Jul. 19, 2007

(51) Int. Cl.
*H04L 1/18* (2006.01)
*G01R 31/08* (2006.01)

(52) U.S. Cl. ...................................... 714/748; 370/231
(58) Field of Classification Search ................. 714/748; 370/231, 238
See application file for complete search history.

(56) References Cited

U.S. PATENT DOCUMENTS 5,754,754 A * 5/1998 Dudley et al. ................. 714/18
7,382,733 B2 6/2008 Banerjee et al.
7,385,926 B2 6/2008 Kitchin
2006/0092836 A1* 5/2006 Kwan et al. .................. 370/229

OTHER PUBLICATIONS

U.S. Appl. No. 10/443,667, filed May 22, 2003, Baratakke et al.
U.S. Appl. No. 10/640,847, filed Aug. 14, 2003, Banejee et al.
U.S. Appl. No. 11/014,540, filed Dec. 16, 2004, Jain et al.
"Transmission Control Protocol DARPA Internet Program Protocol Specification", Information Sciences Institute, California, USA, Sep. 1981, pp. 1-85. http://www.ietf.org/rfc/rfc793.txt, retrieved Oct. 31, 2005.

* cited by examiner

*Primary Examiner*—Shelly A Chase
(74) *Attorney, Agent, or Firm*—Yee & Associates, P.C.; Marilyn S. Dawkins

(57) ABSTRACT

A computer implemented method, apparatus, and computer usable program code to determine whether an acknowledgment packet from an end point acknowledges receipt of unsent data in response to receiving the acknowledgement packet over a connection with the end point. A determination is made as to whether acknowledgement packets for unsent data have been received sequentially a selected number of times over the connection in response to the acknowledgement packet being for unsent data. The acknowledgment packet is dropped if acknowledgement packets have been received sequentially the selected number of times over the connection.

20 Claims, 3 Drawing Sheets

METHOD AND APPARATUS FOR PREVENTING NETWORK OUTAGES

BACKGROUND OF THE INVENTION

1. Field of the Invention

The present invention relates generally to an improved data processing system and in particular to a computer implemented method and apparatus for transferring data between devices. Still more particularly, the present invention relates to a computer implemented method, apparatus, and program usable program code for preventing network outages caused by exchanges of acknowledgement.

2. Description of the Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized both communications and commerce, as well as being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients generate data transactions using the hypertext transfer protocol (HTTP), a known protocol for handling the transfer of various data files, such as text files, graphic images, animation files, audio files, and video files.

In transferring data, transmission control protocol is used to ensure that data arrives accurately and is one hundred percent intact on the receiving end. Transmission control protocol is a connection or protocol. In a transmission control protocol connection, two ends of the connection send data and acknowledge the receipt of data. In sending and receiving data, each packet contains a sequence number and an acknowledgement number. With a transmission control protocol connection, every octet of data sent over this type of connection has a sequence number. The sequence number indicates that all of the octets up to, but not including, the octet identified by the sequence number have been received.

With handling data over a transmission control protocol connection, determinations such as whether the acknowledgement refers to sequence numbers sent but not yet acknowledged are made along with identifying all sequence numbers occupied by segments that have been acknowledged to remove the segment from a retransmission queue. Further, a determination is made as to whether an incoming segment contains sequence numbers, which are expected. Each segment or packet also carries an acknowledgement number. This number is the sequence number of the next expected data octet of transmission.

With this type of mechanism for ensuring reception of data, two ends of a transmission control protocol connection may sometimes enter a "desynchronized" state. With this type of state, both ends of the connection may send acknowledgement packets back and forth over and over, causing an "ACK storm". With this type of exchange of packets, these two end points of the transmission control protocol connection are flooded with acknowledgement packets.

In particular, once one end of a connection enters a desynchronized state, the acknowledgement returned is not accepted because the acknowledgement packet acknowledges data that the end point has not sent. For example, with two end points, end point A and end point B, in a synchronized state, end point A expects sequence number X and has sent Y bytes so far. End point B has a next expected sequence number of Y with X bytes having been sent so far. When a desynchronized state is present, end point A has a next expected sequence number of X and sent so far Y bytes. End point B has a next expected sequence number of Y+Z and has sent so far bytes being X. In this case, end point B expects a sequence number that is Z more bytes than end point A has sent so far in the connection. With this desynchronized state, an acknowledgement sent from B contains a sequence number X and an acknowledgement of Y+Z.

Consequently, end point A will not accept this acknowledgement packet because this packet acknowledges data that end point A has not yet sent. In other words, the acknowledgement packet from B says that end point B has received Y+Z bytes of data so far. In this case, however, end point A has only sent Y bytes of data.

With the protocols for handling transmission control protocol connections, end point A drops the packet after sending an acknowledgement to end point B. This acknowledgement packet includes a sequence number Y and an acknowledgement of X. The sequence number Y indicates that the next expected sequence is Y and that end point A has so far received X bytes. In a similar fashion, end point B drops this acknowledgement packet because the sequence number Y is an old sequence number, which is less than the expected sequence number of Y+Z. With this situation, end point B drops the packet and returns an acknowledgement that contains a sequence number X and acknowledgement Y+Z indicating that it has received Y+Z. As a result, a loop occurs with both ends generating acknowledgements in response to each other's acknowledgements. Traffic is generated without any exchange of data in this situation.

This type of loop or "ACK storm" may be caused by different situations. One situation involves network appliances that may rewrite sequence numbers. The rewriting of sequence numbers results in an incorrect acknowledgement being sent back to an end point. Additionally, in some cases, network interface cards may provide offload functionalities, such as transmission control protocol segmentation offloads. Network adapters that support large sent read-write transmission control protocol sequence numbers and the size of the payload may cause this type of loop. Further, a malicious user may deliberately try to desynchronize transmission control protocol end points to generate this type of loop and to cause the end points to crash or slowdown the network.

SUMMARY OF THE INVENTION

The present invention provides a computer implemented method, apparatus, and computer usable program code to determine whether an acknowledgment packet from an end point acknowledges receipt of unsent data in response to receiving the acknowledgement packet over a connection with the end point. A determination is made as to whether acknowledgement packets for unsent data have been received sequentially a selected number of times over the connection in response to the acknowledgement packet being for unsent data. The acknowledgment packet is dropped if acknowledgement packets have been received sequentially the selected number of times over the connection.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
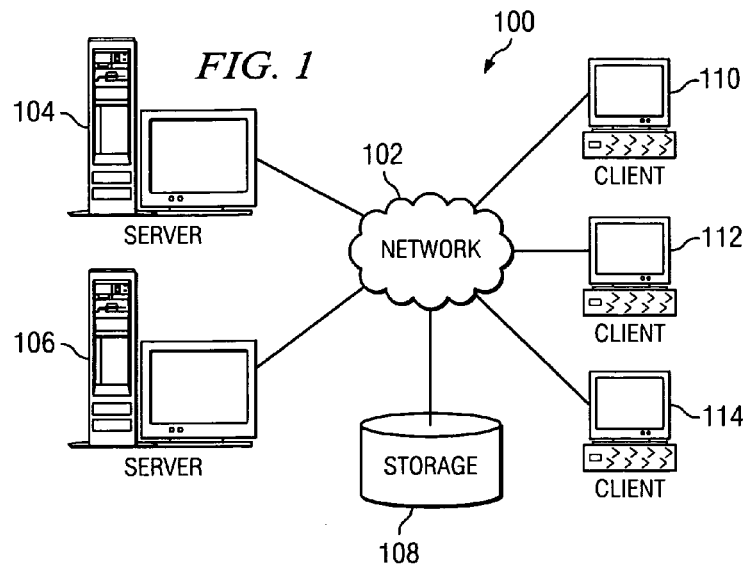
FIG. 1 is a pictorial representation of a network of data processing systems in accordance with an illustrative embodiment of the present invention.
Figure 2:
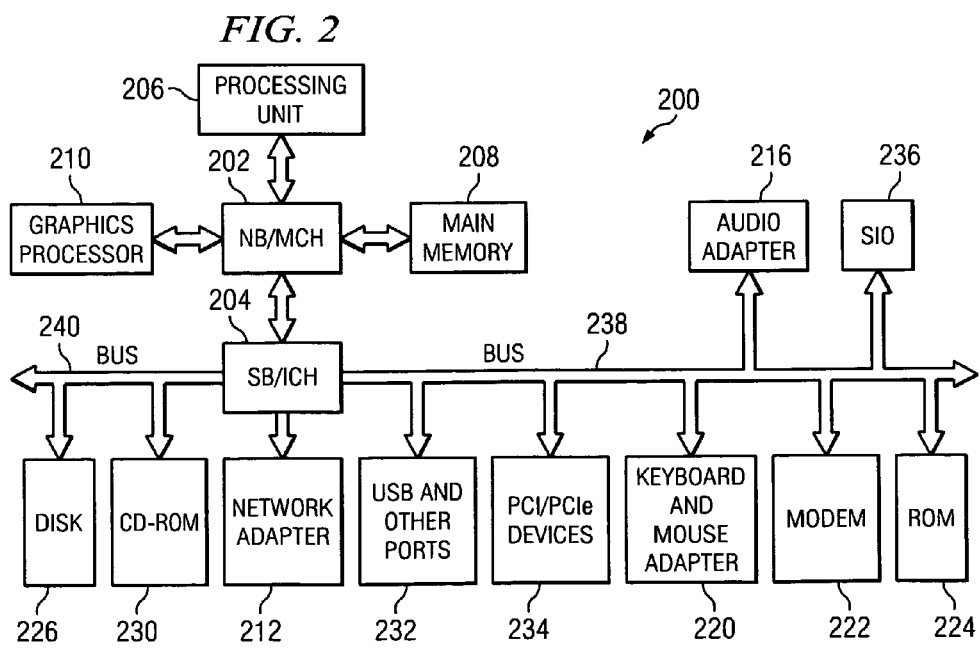
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
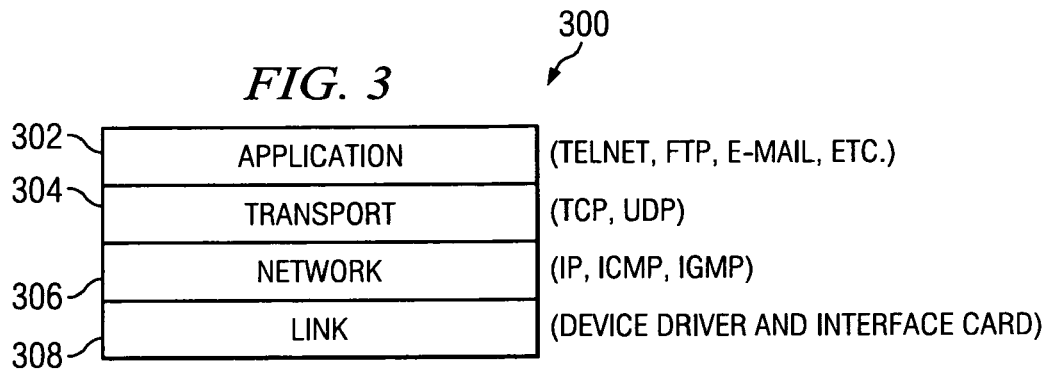
FIG. 3 is a diagram of a transmission control protocol/Internet protocol (TCP/IP) and similar protocols in accordance with an illustrative embodiment of the present invention.

Turning now to FIG. 3, a diagram of a transmission control protocol/Internet protocol (TCP/IP) and similar protocols is depicted in accordance with a preferred embodiment of the present invention. Transmission control protocol /Internet protocol and similar protocols are utilized by communications architecture 300. In this example, communications architecture 300 is a 4-layer system. This architecture includes application layer 302, transport layer 304, network layer 306, and link layer 308. Each layer is responsible for handling various communications tasks. Link layer 308 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 306 also is referred to as the Internet layer and handles the movement of packets of data around the network. For example, network layer 306 handles the routing of various packets of data that are transferred over the network. Network layer 306 in the transmission control protocol/Internet protocol suite is comprised of several protocols, including Internet protocol (IP), Internet control message protocol (ICMP), and Internet group management protocol (IGMP).

Next, transport layer 304 provides an interface between network layer 306 and application layer 302 that facilitates the transfer of data between two host computers. Transport layer 304 is concerned with things such as, for example, dividing the data passed to it from the application into appropriately sized chunks for the network layer below, acknowledging received packets, and setting timeouts to make certain the other end acknowledges packets that are sent. In the transmission control protocol/Internet protocol suite, two distinctly different transport protocols are present, transmission control protocol and user datagram protocol (UDP). Transmission control protocol provides reliability services to ensure that data is properly transmitted between two hosts, including dropout detection and retransmission services.

Conversely, user datagram protocol provides a much simpler service to the application layer by merely sending packets of data called datagrams from one host to the other, without providing any mechanism for guaranteeing that the data is properly transferred. When using UDP, the application layer must perform the reliability functionality.

Application layer 302 handles the details of the particular application. Many common transmission control protocol/Internet protocol applications are present for almost every implementation, including a Telnet for remote login; a file transfer protocol (FTP); a simple mail transfer protocol (SMTP) for electronic mail; and a simple network management protocol (SNMP). In these examples, the different aspects of the present invention may be implemented within the transmission control protocol in transport layer 304. More information on this protocol is found in RFC793, September, 1981.

The aspects of the present invention provide a computer implemented method, apparatus, and computer usable program code for handling situations in which a desynchronized state in a transmission control protocol connection results in a loop in which acknowledgements are exchanged between two end points. In the illustrative examples, a counter is maintained on a per connection basis in which the counter is incremented each time an acknowledgement is received for data that has not yet been sent to an end point. These acknowledgements are received in an acknowledgement packet or segment. This counter is reset to zero when an acknowledgement packet is received that has an acceptable sequence number. In other words, the counter is reset to zero when the acknowledgement packet indicates that the sequence number in the acknowledgement packet is for data that has been transmitted. The counter is incremented if the sequence number in the acknowledgement packet is for data that has not yet been transmitted.

Once the counter reaches a threshold, the incoming acknowledgement packet is dropped and a response is not made. In other words, no acknowledgement packet is sent in reply or response to the incoming acknowledgement packet when the threshold has been reached. In this manner, the endless loop in which acknowledgements are exchanged without sending data is prevented. No more acknowledgement packets are generated in this case because the acknowledgement packets are generated only in response to an acknowledgement packet. As a result, dropping this acknowledgement packet prevents future acknowledgements in these depicted examples. This dropping of the outgoing acknowledgement can be considered equivalent to the network dropping the acknowledgement in these examples.

Additionally, a per connection count also may be maintained to count each time the threshold is reached in the first instance. If this second counter reaches a second threshold level, the connection is aborted. In this instance, the connection is cut by sending a reset, RST to the other end point.

Figure 4:
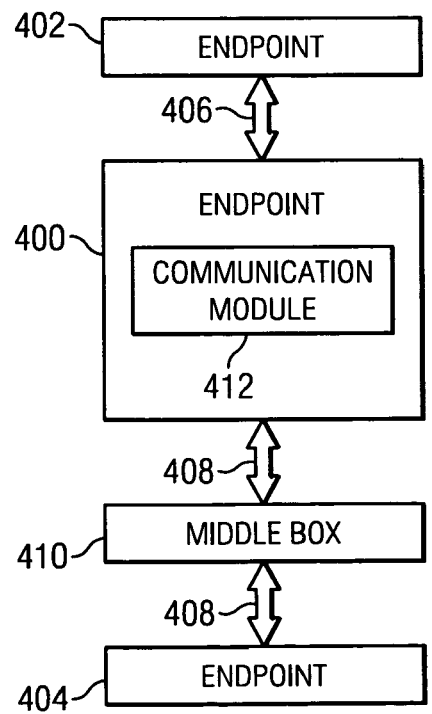
FIG. 4 is a diagram illustrating components used to handle situations in which acknowledgement loops occur in accordance with an illustrative embodiment of the present invention.

Turning now to FIG. 4, a diagram illustrating components used to handle situations in which acknowledgement loops occur is depicted in accordance with an illustrative embodiment of the present invention.

In this example, end point 400 communicates with end points 402 and 404 through transmission control protocol connections. As depicted, end point 400 communicates with end point 402 through transmission control protocol connection 406. This transmission control protocol connection is a direct connection without any proxies or middle boxes between the two end points.

Transmission control protocol connection 408 facilitates communication between end point 400 and end point 404. In this example, transmission control protocol connection 408 is established using middle box 410. Middle box 410 is a transmission control protocol proxy or bridge in this example. This type of proxy may translate a transmission control protocol into another protocol if needed for transmitting data between different end points. This type of middle box may be implemented using various devices, such as a router or computer.

In these illustrative examples, end points 400, 402, and 404 may be implemented as various devices, such as server 106, client 110, or storage 108 in FIG. 1. These end points may be any device that uses a transmission control protocol connection to exchange data with other end points.

In this example, a desynchronized state may occur if a malicious user at end point 402 changes the sequence number such that the acknowledgement packet sent by end point 402 is for data not yet sent by end point 400. Additionally, a desynchronized state also may occur if middle box 410 pads or adds bytes to the data being sent to end point 404. As a result, the acknowledgement packet sent by end point 404 may contain a sequence number for data not yet sent by end point 400.

In either situation, a loop of acknowledgement packets being exchanged may begin resulting in slowdowns in the network traffic or in a failure or crash in the end points. The aspects of the present invention recognize that these types of situations are undesirable. As a result, the aspects of the present invention include processes in a component, such as communications module 412 within end point 400 to handle these types of situations.

Communications module 412 is a software and/or hardware component that implements the transmission control protocol. For example, communications module 412 may implement one of more layers in communications architecture 300 in FIG. 3. In particular, the aspects of the present invention may be located within transport layer 304 in FIG. 3. In these examples, the aspects are implemented in the transmission control protocol. More specifically, transmission control protocol state processing is the location of these processes for the aspects of the present invention. In this example, communications module 412 tracks acknowledgement packets received from end points 402 and 404. These end points are tracked on a per connection basis. These acknowledgements also are tracked using counters. In other words, a counter is established for transmission control protocol connection 406 and a second counter is established for transmission control protocol connection 408. Each time an acknowledgement packet is received containing a sequence number for data not yet sent, the counter for the connection through which the acknowledgement packet is received is incremented. If the sequence number in the acknowledgement packet is for data that has been sent, the counter is reset to zero.

Each time an acknowledgement packet containing a sequence number for data is not yet received, the counter is compared to a threshold after incrementing the counter. If a threshold is reached, the acknowledgement packet is dropped. By dropping the acknowledgement packet, a return acknowledgement packet is not sent and the loop of acknowledgement packets being sent back and fourth between end points 400 and 402 is terminated.

Additionally, the aspects of the present invention also increment a second counter every time the threshold is reached. This second counter is compared to a second threshold. If the second threshold is reached, the connection is aborted or dropped. In these examples, transmission control protocol connection 406 may be dropped by sending a reset command, RST, to end point 402. This mechanism is used to terminate connections in which repeated occurrences of acknowledgement loops occur. Of course, any mechanism may be used to terminate the connection other than sending a reset command, depending on the particular implementation.

In a similar fashion, end point 400 monitors acknowledgements for transmission control protocol connection 408. In other words, end point 400 looks for acknowledgement packets that are received from end point 404 through transmission control protocol connection 408. With this type of mechanism, an "ACK storm" that may slow down network traffic or cause the end points to crash is avoided.

Figure 5:
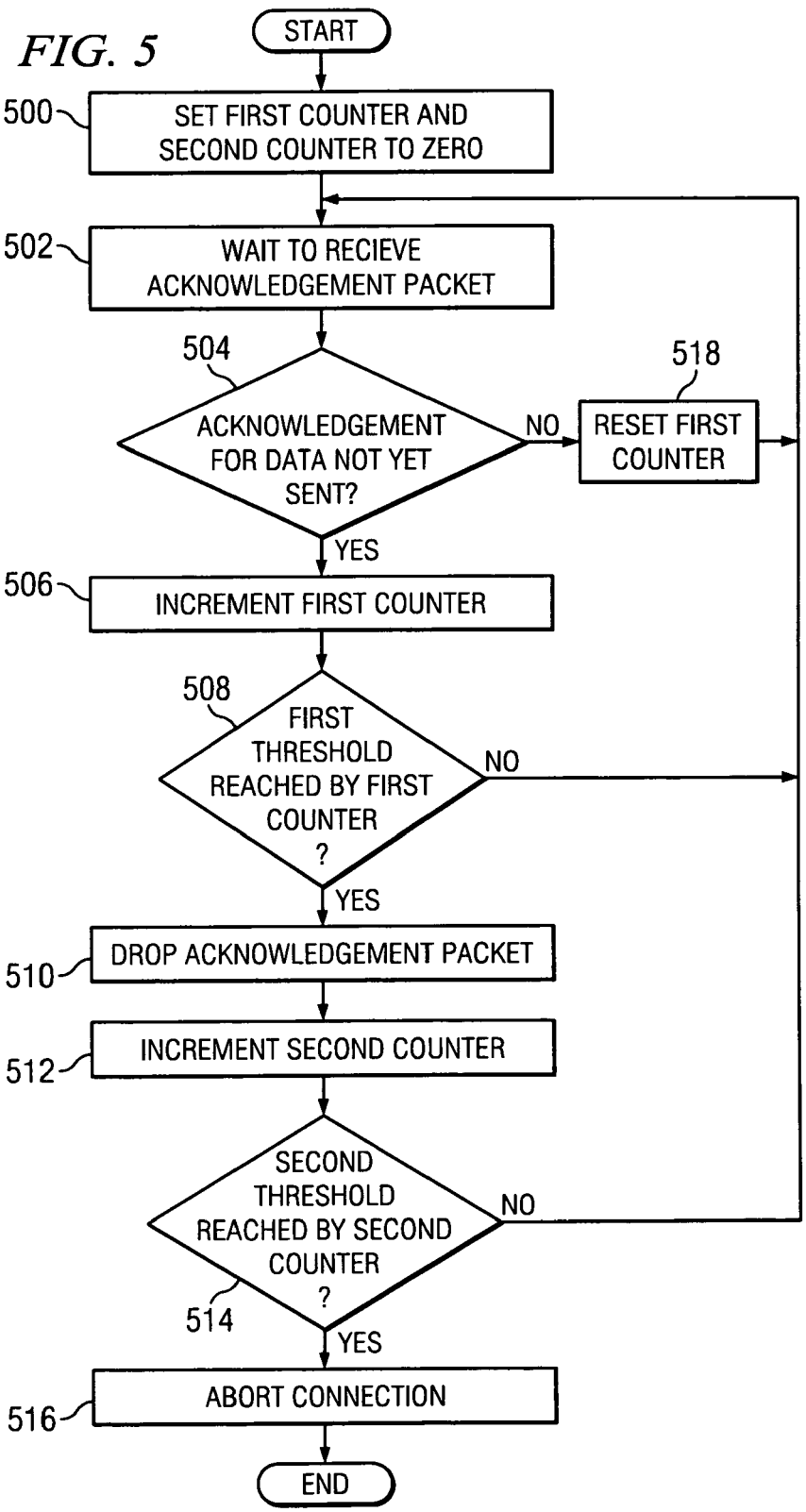
FIG. 5 is a flowchart of a process for handling acknowledgements at an end point in accordance with an illustrative embodiment of the present invention.

Turning now to FIG. 5, a flowchart of a process for handling acknowledgements at an end point is depicted in accordance with an illustrative embodiment of the present invention. The process illustrated in FIG. 5 may be implemented in a component, such as communications module 412 in FIG. 4. This process is initiated when a transmission control protocol connection is established between two end points, such as end point 400 and end point 402 in FIG. 4. This process is initiated for each connection that occurs between end points in these examples.

The process begins by setting a first counter and a second counter equal to zero (step 500). Thereafter, the process waits to receive an acknowledgement packet from the end point (step 502). When an acknowledgement packet is received, a determination is made as to whether the acknowledgement packet is an acknowledgement for data not yet sent (step 504). In this example, a determination in step 504 is made by examining the sequence number returned in the acknowledgement packet. This sequence number is compared with the data that has been sent to the end point. If the sequence number acknowledges data that has not yet been sent, the first counter is incremented (step 506).

Next, a determination is made as to whether the first threshold is reached by the first counter (step 508). This threshold may be set to any number depending on the particular implementation. In this example, the threshold is set equal to 5. In these examples, the range of values for the threshold are from 3 to 10. If the first threshold has not been reached, the process returns to step 502. Otherwise, the acknowledgement packet is dropped (step 510). The dropping of the acknowledgement packet breaks the loop. This dropping of the acknowledgement packet is similar to when the packet is dropped by the network. As a result, the end point does not reply with an acknowledgement packet.

Thereafter, the second counter is incremented (step 512). A determination is made as to whether a second threshold has been reached by the second counter (step 514). Of course, any threshold level may be set, depending on the particular implementation. In this example, the second threshold is set equal to 3. In other words, this loop may be repeated up to 3 times before action is taken. If the second threshold has not been reached, the process returns to step 502. Otherwise, the connection is aborted (step 516) with the process terminating thereafter. The process supports the connection by sending a reset, RST, command to the other end point in this example.

With reference again to step 504, if the acknowledgement in the acknowledgement packet is not for data that has not yet been sent, the acknowledgement is a correct one, and the process resets the first counter (step 518) with the process then returning to step 502.

Thus, the aspects of the present invention provide a computer implemented method, apparatus, and computer usable program code for managing acknowledgements between end points. The aspects of the present invention identify when a loop of acknowledgements is occurring. This loop is terminated after some number of exchanges of acknowledgement packets. Further, the aspects of the present invention may terminate the connection if a loop reoccurs too many times in the connection between the end points. In this manner, network outages or slowdowns caused by large amounts of network traffic or by end points that crash are reduced or avoided.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a connection, the computer implemented method comprising:
   responsive to receiving an acknowledgement packet over a connection to an end point, determining whether the acknowledgment packet from the end point acknowledges receipt of unsent data;
   responsive to the acknowledgement packet being for unsent data, determining whether acknowledgement packets for unsent data have been received sequentially a selected number of times over the connection; and
   dropping the acknowledgment packet if acknowledgement packets have been received sequentially the selected number of times over the connection.

2. The computer implemented method of claim 1 further comprising:
   responsive to dropping the acknowledgment packet, determining whether the acknowledgement packets have been dropped a particular number of times; and
   dropping the connection if the acknowledgement packets have been dropped the particular number of times.

3. The computer implemented method of claim 1, wherein the connection is a transmission control protocol connection.

4. The computer implemented method of claim 2, wherein the dropping step comprises:
   sending a reset command to the end point.

5. The computer implemented method of claim 1, wherein the selected number is 5 and the particular number is 3.

6. The computer implemented method of claim 1, wherein the acknowledgment contains a sequence number identifying data received by the end point.

7. The computer implemented method of claim 1, wherein the receiving step, the determining step, and the dropping step are implemented in a transport layer.

8. A computer program product comprising:
   A computer usable medium having computer usable program code for managing a connection, the computer program product including:
   computer usable program code, responsive to receiving an acknowledgement packet over a connection to an end point, for determining whether the acknowledgment packet from the end point acknowledges receipt of unsent data;
   computer usable program code, responsive to the acknowledgement packet being for unsent data, for determining whether acknowledgement packets for unsent data have been received sequentially a selected number of times over the connection; and
   computer usable program code for dropping the acknowledgment packet if acknowledgement packets have been received sequentially the selected number of times over the connection.

9. The computer program product of claim 8 further comprising:
   computer usable program code, responsive to dropping the acknowledgment packet, for determining whether the acknowledgement packets have been dropped a particular number of times; and
   computer usable program code for dropping the connection if the acknowledgement packets have been dropped the particular number of times.

10. The computer program product of claim 8, wherein the connection is a transmission control protocol connection.

11. The computer program product of claim 9, wherein the computer usable program code for dropping the connection if acknowledgement packets have been dropped the particular number of times comprises:

computer usable program code for sending a reset command to the end point.

12. The computer program product of claim 8, wherein the selected number is 5 and the particular number is 3.

13. The computer program product of claim 8, wherein the acknowledgment contains a sequence number identifying data received by the end point.

14. The computer program product of claim 8, wherein the computer usable program code, responsive to receiving an acknowledgement packet over a connection with an end point, for determining whether the acknowledgment packet from the end point acknowledges receipt of unsent data, the computer usable program code, responsive to the acknowledgement packet being for unsent data, for determining whether acknowledgements for unsent data have been received sequentially a selected number of times over the connection, and the computer usable program code for dropping the acknowledgment packet if acknowledgements have been received sequentially the selected number of times over the connection are implemented in a transport layer.

15. A data processing system comprising:

a bus;

a communications unit connected to the bus;

a storage device connected to the bus, wherein the storage device includes a set of computer usable program code; and a processor unit connected to the bus, wherein the processor unit executes the set of computer usable program code to determine whether the acknowledgment packet from the end point acknowledges receipt of unsent data in response to receiving the acknowledgement packet over a connection with an end point; determine whether acknowledgement packets for unsent data have been received sequentially a selected number of times over the connection in response to the acknowledgement packet being for unsent data; and drop the acknowledgment packet if acknowledgement packets have been received sequentially the selected number of times over the connection.

16. The data processing system of claim 15, wherein the processor unit further executes the computer usable program code to determine whether the acknowledgement packets have been dropped a particular number of times in response to dropping the acknowledgment packet; and drop the connection if the acknowledgement packets have been dropped the particular number of times.

17. The data processing system of claim 15, wherein the connection is a transmission control protocol connection.

18. The data processing system of claim 16, wherein the processor unit further executes the computer usable program code to send a reset command to the end point.

19. The data processing system of claim 15, wherein the selected number is 5 and the particular number is 3.

20. The data processing system of claim 15, wherein the acknowledgment contains a sequence number identifying data received by the end point.

* * * * *